(12) United States Patent
Edom et al.

(10) Patent No.: US 9,067,678 B2
(45) Date of Patent: Jun. 30, 2015

(54) SIDE FEEDER AIR GUIDING ELEMENT FOR AN AIRCRAFT AIR-CONDITIONING SYSTEM

(75) Inventors: Andreas Edom, Hamburg (DE); Ingo Gores, Hamburg (DE); Thorsten Raible, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 918 days.

(21) Appl. No.: 13/122,525

(22) PCT Filed: Sep. 8, 2009

(86) PCT No.: PCT/EP2009/006509
§ 371 (c)(1),
(2), (4) Date: Aug. 10, 2011

(87) PCT Pub. No.: WO2010/040434
PCT Pub. Date: Apr. 15, 2010

(65) Prior Publication Data
US 2011/0294409 A1    Dec. 1, 2011

Related U.S. Application Data

(60) Provisional application No. 61/102,898, filed on Oct. 6, 2008.

(30) Foreign Application Priority Data

Oct. 6, 2008   (DE) .......................... 10 2008 050 546

(51) Int. Cl.
*B64D 13/00* (2006.01)
*F24F 13/072* (2006.01)
(Continued)

(52) U.S. Cl.
CPC ........ *B64D 13/00* (2013.01); *B64D 2013/0625* (2013.01); *F24F 13/072* (2013.01); *F24F 2013/242* (2013.01)

(58) Field of Classification Search
CPC ......... B64D 13/00; B64D 13/06; Y02T 50/56

USPC ................................. 454/76, 83, 71
See application file for complete search history.

(56) References Cited

U.S. PATENT DOCUMENTS 2,969,009 A    1/1961   Caldwell
3,303,771 A *  2/1967   Nesher et al. ................. 454/187
(Continued)

FOREIGN PATENT DOCUMENTS

CN          2609949       4/2004
CN          1687660       10/2005
(Continued)

OTHER PUBLICATIONS

European Patent Office, International Search Report, Form PCT/ISA/220 (3 pgs.), Form PCT/ISA/210 (4 pgs.), and Form PCT/ISA/237 (6 pgs.), Mar. 10, 2010.
(Continued)

*Primary Examiner* — Steven B McAllister
*Assistant Examiner* — Jonathan Cotov
(74) *Attorney, Agent, or Firm* — Wood, Herron & Evans, LLP (57) ABSTRACT

An air guiding element for an aircraft air-conditioning system includes a distributing pipe having an air inlet opening arranged in the region of an end face of the distributing pipe and an air discharge opening arranged in the region of a generated surface of the distributing pipe. The air guiding element further comprises a flow diverting element having a first section connected to the air discharge opening of the distributing pipe and a second section arranged downstream of the first section relative to the direction of the air flow through the air guiding element. The second section is configured to deflect the air as it flows through the second section at an angle of approximately 45 to 135° relative to the direction of the air flow through the first section, and a diffuser which is arranged downstream of the second section.

14 Claims, 2 Drawing Sheets

(51) Int. Cl.
*B64D 13/06* (2006.01)
*F24F 13/24* (2006.01)

(56) References Cited

U.S. PATENT DOCUMENTS

| | | | | |
|---|---|---|---|---|
| 3,355,210 A | * | 11/1967 | Cripe | 454/162 |
| 3,492,934 A | | 2/1970 | Steigerwald | |
| 3,511,336 A | * | 5/1970 | Rink et al. | 181/224 |
| 3,687,054 A | * | 8/1972 | Boberg | 454/76 |
| 4,546,693 A | * | 10/1985 | McTaw, Jr. | 454/128 |
| 4,819,548 A | * | 4/1989 | Horstman | 454/76 |
| 5,197,920 A | * | 3/1993 | Ganse | 454/228 |
| 6,004,204 A | * | 12/1999 | Luxton et al. | 454/263 |
| 6,139,423 A | * | 10/2000 | Wadey | 454/142 |
| 6,752,712 B1 | * | 6/2004 | Short et al. | 454/76 |
| 6,851,515 B2 | * | 2/2005 | Dussac et al. | 181/284 |
| 6,905,985 B1 | * | 6/2005 | Schindzielorz et al. | 442/65 |
| 7,780,423 B2 | * | 8/2010 | Liang | 417/423.15 |
| 8,118,648 B2 | * | 2/2012 | Bruggen et al. | 454/76 |
| 8,328,607 B2 | * | 12/2012 | Reisbach | 454/76 |
| 2005/0230488 A1 | * | 10/2005 | Markwart et al. | 237/10 |
| 2007/0287375 A1 | * | 12/2007 | Shuen | 454/187 |
| 2008/0268762 A1 | * | 10/2008 | Bruggen et al. | 454/76 |
| 2010/0009617 A1 | * | 1/2010 | Huber et al. | 454/76 |
| 2010/0192616 A1 | * | 8/2010 | Gores et al. | 62/408 |

FOREIGN PATENT DOCUMENTS

| | | |
|---|---|---|
| CN | 2834265 | 11/2006 |
| CN | 2879710 | 3/2007 |
| CN | 2881173 Y | 3/2007 |
| DE | 102007019538 | 10/2008 |
| DE | 102007019539 | 10/2008 |
| EP | 0362958 | 4/1990 |
| EP | 1550569 | 7/2005 |

OTHER PUBLICATIONS

Chinese Patent Office, Office Action, Aug. 23, 2013, 6 pages.
Chinese Patent Office, Office Action, Jan. 14, 2013, 6 pages.
Chinese Patent Office, Office Action, Jul. 21, 2014, 6 pages.

* cited by examiner

SIDE FEEDER AIR GUIDING ELEMENT FOR AN AIRCRAFT AIR-CONDITIONING SYSTEM

This application claims priority to PCT Application No. PCT/EP2009/006509, filed on Sep8, 2009, as a national stage entry under Section 371, which claims priority to German Application No. 10 2008 050 546.3 and U.S. Provisional Application No. 61/102,898, both filed on Oct. 6, 2008.

TECHNICAL FIELD

The invention relates to an air guiding element for an aircraft air-conditioning system which serves, for example, to direct conditioned air provided by the aircraft air-conditioning system into a passenger cabin of the aircraft. The invention further relates to an aircraft air-conditioning system which is equipped with such an air guiding element.

BACKGROUND

An aircraft air-conditioning system comprises a series of air guiding elements to which air, which flows via an air inlet opening through a duct system of the aircraft air-conditioning system, is supplied and which serve to direct the conditioned air which is provided by the aircraft air-conditioning system into the passenger cabin of the aircraft. In modern commercial aircraft, the air guiding elements may be arranged, for example, in the foot space of the passenger cabin and/or in the region of the luggage compartments mounted above the seat rows, that is to say in the triangular region between the luggage compartments, the aircraft outer skin and the cabin lining. In the case of a known air guiding element with lateral air feed, a so-called side feeder air guiding element, the air inlet opening opens into a distributing pipe which tapers in the flow direction of the air flowing through the air guiding element and in which the air supplied via the air inlet opening is diverted by 90° in the direction of an air outlet opening. To control the distribution of the air flow leaving the air outlet opening of the air guiding element, the air on its flow path through the air guiding element is customarily directed through at least one grid screen or apertured screen. The grid screen(s) or apertured screen(s) causes/cause a backing-up of the air flowing through the air guiding element and thus a pressure drop which is intended to enable a uniform outflow of the air over the entire cross-section of the air outlet opening of the air guiding element.

However, particularly in the case of side feeder air guiding elements with low installation depths, that is to say side feeder air guiding elements in which the distance between the air inlet opening and the air outlet opening is small, the problem arises that the flat grid screen(s) or apertured screen(s) used in these elements cannot eliminate to a sufficient degree the momentum directed in the direction of the air flow through the air inlet opening. This may result in the air flow not leaving the air outlet opening in a desired direction, that is to say, for example, at an angle of 90° relative to the flow direction of the air through the air inlet opening, but rather the air flowing out at an angle, that is to say inclined relative to the desired outflow direction.

SUMMARY OF THE INVENTION

The present invention is directed at the object of providing a compactly constructed air guiding element which is suitable for use in an aircraft air-conditioning system and enables a uniform outflow of air over a cross-section of an air outlet opening in a desired direction.

To achieve this object, an air guiding element for an aircraft air-conditioning system according to the invention has a distributing pipe comprising an air inlet opening arranged in the region of an end face of the distributing pipe and an air discharge opening arranged in the region of a generated surface of the distributing pipe. The distributing pipe may be, for example, of cylindrical shape and have a round, oval, angular or other cross-section. All that is essential is that the air is fed into the distributing pipe in the region of the end face of the distributing pipe, that is to say in a direction parallel to a longitudinal axis of the distributing pipe, whereas the air is led out of the distributing pipe through the air discharge opening arranged in the region of the generated surface of the distributing pipe, that is to say in a direction perpendicular to the longitudinal axis of the distributing pipe. The flow cross-section of the air discharge opening is smaller than the flow cross-section of the distributing pipe, so that the distributing pipe acts as a plenum in which the air supplied via the air inlet opening backs up and thereby already a large part of its momentum directed in the direction of the air flow through the air inlet opening is eliminated.

The air guiding element according to the invention further comprises a flow diverting element through which air from the distributing pipe can flow, having a first section connected to the air discharge opening of the distributing pipe and a second section arranged downstream of the first section relative to the direction of the air flow through the air guiding element. The second section is configured to deflect the air as it flows through the second section at an angle of approximately 45 to 135° relative to the direction of the air flow through the first section. In other words, the second section is shaped and oriented relative to the first section such that the air flowing through the air guiding element is diverted once again in the second section. The shape and the orientation of the second section of the flow diverting element relative to the first section of the flow diverting element and thus the diversion of the air in the second section of the flow diverting element can be adapted according to the installation space available for the air guiding element in the aircraft and/or according to the desired properties and direction of the air flow on leaving the air guiding element.

The air guiding element according to the invention finally comprises a diffuser which is arranged downstream of the second section of the flow diverting element relative to the direction of the air flow through the air guiding element and is connected to an air outlet opening. The diffuser has a flow cross-section widening continuously in the direction of the air flow through the air guiding element and serves to slow down the air flow through the air guiding element and distribute it over the cross-section of the air outlet opening.

With the aid of the air guiding element according to the invention, the momentum of the air flow directed in the direction of the air flow through the air inlet opening can be eliminated before the air flow leaves the air outlet opening of the air guiding element to the extent that the air leaves the air outlet opening of the air guiding element in the desired direction. Furthermore, the design of the air guiding element enables a uniform outflow of the air over the entire cross-section of the air outlet opening, so that proper functioning of the air guiding element according to the invention is ensured even if the air outlet opening is arranged at a short distance from the air inlet opening. The air guiding element according to the invention can therefore be of particularly compact and lightweight construction and is therefore particularly well suited for use on board an aircraft.

The air discharge opening of the distributing pipe is preferably of slit-shaped form. To simplify the geometry of the air guiding element according to the invention, the air discharge opening of the distributing pipe preferably extends substantially parallel to a longitudinal axis of the distributing pipe. An optimal flow control effect of the distributing pipe is achieved when the air discharge opening, for example of slit-shaped form, extends over at least 80% of the length of the distributing pipe. The length of the distributing pipe and of the air discharge opening formed in the distributing pipe can be adapted to the specific application requirements. In one embodiment, the length of the distributing pipe may correspond, for example, to the spacing between two frames of the aircraft structure. If desired or required, however, a greater length of the distributing pipe may also be chosen, so that an air guiding element extending over a plurality of frames may also be realised. Furthermore, it is conceivable to provide a single distributing pipe with adapted diameter having a plurality of air discharge openings separated from one another.

The air discharge openings formed in a distributing pipe of this type may then be connected to corresponding flow diverting elements and diffusers.

Preferably, the second portion of the flow diverting element is configured to divert the air as it flows through the second section at an angle of approximately 55 to 125°, 65 to 115°, 75 to 105° or 85 to 95° relative to the direction of the air flow through the first section. In a particularly preferred embodiment of the air guiding element according to the invention, however, the second portion of the flow diverting element is configured to divert the air as it flows through the second section at an angle of approximately 90° relative to the direction of the air flow through the first section. The air guiding element according to the invention is then particularly suited for use in an aircraft air-conditioning system where it is arranged in the triangular region between the luggage compartments, the aircraft outer skin and the cabin lining and directs the air provided by the aircraft air-conditioning system into the aircraft cabin at an angle of approximately 90° to the flow direction of the air through the distributing pipe arranged parallel to a longitudinal axis of the aircraft cabin.

The second section of the flow diverting element may be of curved form. Preferably, the flow diverting element has along its length a substantially constant flow cross-section which is adapted to a flow cross-section of the air discharge opening of the distributing pipe.

For example, the flow diverting element may be formed by two shells which are connectable to one another and delimit an interior space of the flow diverting element through which air can flow. These shells may be composed, for example, at least in sections of a glass-fibre-reinforced plastics material. Similarly, the diffuser may be formed by two shells which are connectable to one another and delimit an interior space of the diffuser through which air can flow. These shells in turn may be composed at least in sections of a glass-fibre-reinforced plastics material. Preferably, the shells forming the diffuser are designed in one piece with the shells forming the flow diverting element.

There may be arranged in the flow diverting element a plurality of webs which extend parallel to the flow direction of the air through the flow diverting element. Preferably, an end of the webs facing the distributing pipe is at a distance from the air discharge opening of the distributing pipe which corresponds to the distance of the shells forming the flow diverting element from one another, that is to say the width of the through-flow gap of the flow diverting element. From this end, the webs preferably extend through the entire flow diverting element up to an inlet into the diffuser. The flow path through the flow diverting element is subdivided by the webs into a multiplicity of guiding channels, the distance between two mutually adjacent webs preferably being approximately twice as big as the distance of the shells forming the flow diverting element from one another, that is to say the width of the through-flow gap of the flow diverting element. The guiding channels formed by the webs force the air flowing through the flow diverting element in a flow direction oriented at an angle of 90° relative to the direction of the air flow through the air inlet opening. As a result, the momentum of the air in the direction of the air flow through the air inlet opening which is still present as it enters the air discharge opening of the distributing pipe is markedly reduced. The guiding channels formed in the flow diverting element thus ensure effective diversion of the air flow in the desired "new" flow direction.

The diffuser preferably has a flow cross-section widening continuously in the direction of the air flow through the air guiding element. The opening angle of the diffuser is in this case chosen such that flow separations and turbulence are avoided. For example, the diffuser can be configured such that it has two side walls each inclined radially outwards by the same angle relative to its longitudinal axis. The longitudinal axis of the diffuser extends in the direction of the air flow on leaving the second section of the flow diverting element. The angle of inclination of the side walls of the diffuser may be, for example, 7°.

In an air guiding element in which the air flow is diverted in the flow diverting element by, for example, approximately 90°, the air flowing through the flow diverting element has a momentum in the direction of the air flow through the first section of the flow diverting element. In other words, a backing-up of the air therefore occurs in an air diverting region of the flow diverting element. In order to take account of this momentum of the air in the direction of the air flow through the first section of the flow diverting element, the diffuser of the air guiding element according to the invention preferably has a first side wall arranged substantially parallel to the longitudinal axis of the diffuser and a second side wall inclined at an angle to the longitudinal axis of the diffuser in the direction of the flow of the air through the first section of the flow diverting element. The first side wall may be, for example, a side wall of the diffuser facing the distributing pipe of the air guiding element. The second side wall may be, for example, a side wall of the diffuser facing away from the distributing pipe of the air guiding element. The angle of inclination of the second side wall is preferably again chosen such that flow separations and turbulence are avoided. For example, the second side wall may be inclined at an angle of approximately 14° to the longitudinal axis of the diffuser.

In the case of air guiding elements known hitherto, a further problem is that only noise produced in air supply pipes connected to the air guiding elements is eliminated by noise damping tubes. In contrast, noise which is produced inside the air guiding elements, for example, by diversion of the air stream in a confined space or by flow separations caused, for example, by sudden changes of the flow cross-section enters the aircraft cabin undamped. To combat this problem and damp the noise arising in the air guiding element, at least one side wall of the flow diverting element of the air guiding element according to the invention is therefore composed at least in sections of a sound-absorbing foam material. Alternatively or additionally to this, at least one side wall of the diffuser is furthermore composed at least in sections of a sound-absorbing foam material. In the air guiding element according to the invention, flow channels which have a great length compared with their height can thus be provided with a sound-absorbing foam material, thereby enabling effective sound damping. As a sound-absorbing material it is possible to use, for example, a polyimide foam or a melamine foam, such as, for example, a Basotec® foam.

In the air guiding element according to the invention, the flow diverting element has in an air diverting region preferably an inner radius and an outer radius. In the flow diverting element, sound is reflected from a side wall forming the inner radius of the flow diverting element onto a side wall forming the outer radius. Applying a sound-absorbing material to the side wall of the flow diverting element forming the inner radius is therefore relatively ineffective. In the case of the air guiding element according to the invention, preferably only the side wall of the flow diverting element forming an outer radius of the flow diverting element is therefore formed at least in sections of a sound-absorbing foam material. In contrast, the side wall of the flow diverting element forming an inner radius of the flow diverting element can be composed, for example, completely of a glass-fibre-reinforced plastics material.

In contrast, in the region of the diffuser preferably both the first side wall of the diffuser facing the distributing pipe and the second side wall of the diffuser facing away from the distributing pipe are composed at least in sections of a sound-absorbing foam material. In order to take account of the fact that in the region of the flow diverting element the sound is reflected from the side wall forming an inner radius of the flow diverting element onto the side wall forming an outer radius of the flow diverting element, the sound-absorbing foam material in the region of the side wall forming an outer radius of the flow diverting element preferably has a greater thickness than would be necessary if no reflection effects occurred. For example, the thickness of the foam material in the region of the side wall forming an outer radius of the flow diverting element may be approximately 25 mm. In contrast, in the region of the diffuser, no reflection effects occur, so that the sound-absorbing sound material arranged in the region of the side walls of the diffuser may each have a lower thickness than the side wall of the flow diverting element forming an outer radius of the flow diverting element. For example, in the region of the diffuser a thickness of the sound-absorbing foam material of approximately 15 mm may be sufficient.

A proper sound-damping effect of the foam material sections provided in the side walls of the flow diverting element and of the diffuser is only ensured if sufficient contact is present between a surface of the foam material sections facing the interior space of the flow diverting element and of the diffuser and the air flowing through the air guiding element. The foam material sections are therefore preferably incorporated into the shells forming the flow diverting element and the diffuser in such a way that direct contact is possible between the surface of the foam material sections facing the interior space of the flow diverting element and of the diffuser and the air flowing through the air guiding element.

To stabilise the foam material surface, that is to say to avoid damaging effects on the foam material surface caused, for example, by the air flow led through the air guiding element, a surface, facing the interior space of the flow diverting element, of a side wall section of the flow diverting element composed of a sound-absorbing foam material is preferably provided with a perforated cover. Similarly, a surface, facing the interior space of the diffuser, of a side wall section of the diffuser composed of a sound-absorbing foam material is preferably likewise provided with a perforated cover. The cover may be, for example, in the form of a laminate applied to the foam material surface, which laminate, however, must be sufficiently perforated to ensure proper contact between the air flowing through the air guiding element and the foam material surface(s).

Downstream of the diffuser, the air guiding element according to the invention preferably comprises an air outlet channel, the flow cross-section of which corresponds to the outlet cross-section of the diffuser. In other words, the air outlet channel of the air guiding element forms a continuation of the diffuser with a constant flow cross-section. In the air guiding channel, that is to say in the region of an end of the air outlet channel facing the diffuser, an apertured screen is preferably arranged. The air outlet channel is preferably formed by two shells which can be connected to one another and delimit an interior space of the air outlet channel through which air can flow, the shells which form the air outlet channel preferably each being designed in one piece with the shells which form the flow diverting element and the diffuser. The apertured screen may then be simply and conveniently adhesively bonded between the shells forming the air outlet channel.

While the diffuser ensures a distribution of the air flowing through the air guiding element over the outlet cross-section, in front of the apertured screen arranged in the air outlet channel a backing-up of the air once again takes place. The pneumatic overall resistance of the air guiding element according to the invention consequently results on the one hand from the pressure build-up in the distributing pipe and on the other hand from the pressure build-up in front of the apertured screen. While the pressure in the distributing pipe is determined by the narrowing of the flow cross-section between the distributing pipe and the flow diverting element and also the length of the flow path through the flow diverting element, the pressure build-up in front of the apertured screen is determined by the design of the apertured screen. In particular, the pressure build-up in front of the apertured screen may be controlled by appropriate adaptation of the number and diameter of the holes provided in the apertured screen. Preferably, the apertured screen is configured such that the pressure drop across the apertured screen is 50 Pa at a nominal air flow rate. For example, the apertured screen may be provided with holes arranged in two rows, a spacing between two mutually adjacent holes of one row preferably being equal to the spacing of the hole rows from one another.

The apertured screen of the air guiding element according to the invention preferably comprises a base plate, the dimensions of which correspond to the flow cross-section of the air outlet channel. In the region of a surface of the base plate facing the diffuser, the holes formed in the base plate of the apertured screen are preferably provided with an entry radius at their edges. In other words, the holes formed in the base plate of the apertured screen have no sharp edges in the region of the surface of the base plate facing the diffuser, but a "soft" form. Turbulence which forms as the air passes through the narrowed flow cross-section of the holes is thereby minimised.

A plurality of air guiding sleeves preferably extend from a surface of the apertured screen base plate facing away from the diffuser, that is to say from a surface of the apertured screen base plate facing the air outlet opening of the air guiding element. These air guiding sleeves reduce turbulence in the air flow flowing through the air guiding sleeves and ensure guidance of the air flow perpendicularly to the base plate of the apertured screen. The length of the air guiding sleeves preferably corresponds to their inside diameter. For example, the air guiding sleeves may have a length of approximately 5 mm. The air guiding sleeves enable the desired guidance of the air flow without it being necessary to design the apertured screen thicker and thus heavier for this purpose.

There may furthermore be arranged, substantially parallel to one another, in the air outlet channel of the air guiding element according to the invention a plurality of guide plates which subdivide the air outlet channel into a plurality of part-channels. The guide plates may be composed of any suitable material, for example of metal or a plastics material. As a result of the guide plates, the air flow is once again guided before it leaves the air outlet opening of the air guiding element. The guide plates may be arranged at a distance from ends of the air guiding sleeves facing the air outlet opening of the air guiding element which corresponds to the inside diameter of the air guiding sleeves. Preferably, the guide plates extend up to the air outlet opening, that is to say the guide plates preferably end at an edge of the air outlet duct opening into the air outlet opening. The guide plates may be simply and conveniently adhesively bonded between the shells forming the air outlet duct.

An aircraft air-conditioning system according to the invention comprises at least one above-described air guiding element.

BRIEF DESCRIPTION OF THE DRAWINGS

A preferred embodiment of the invention will now be explained in more detail with reference to the accompanying schematic drawings, in which.

DETAILED DESCRIPTION

Figure 1:
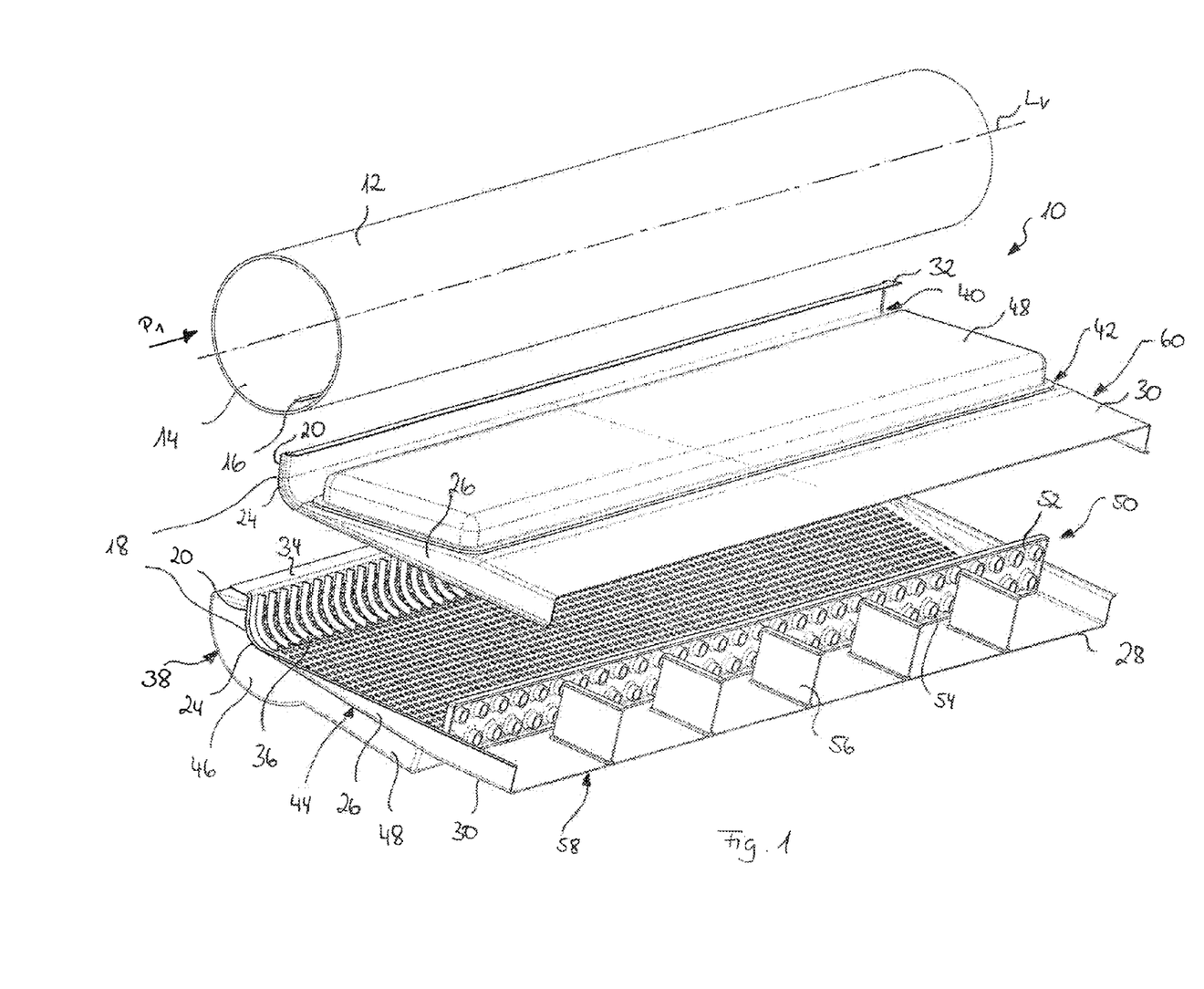
FIG. 1 shows a three-dimensional exploded view of an air guiding element for an aircraft air-conditioning system and FIG. 2 shows a cross-sectional view of the air guiding element according to FIG. 1.
Figure 2:
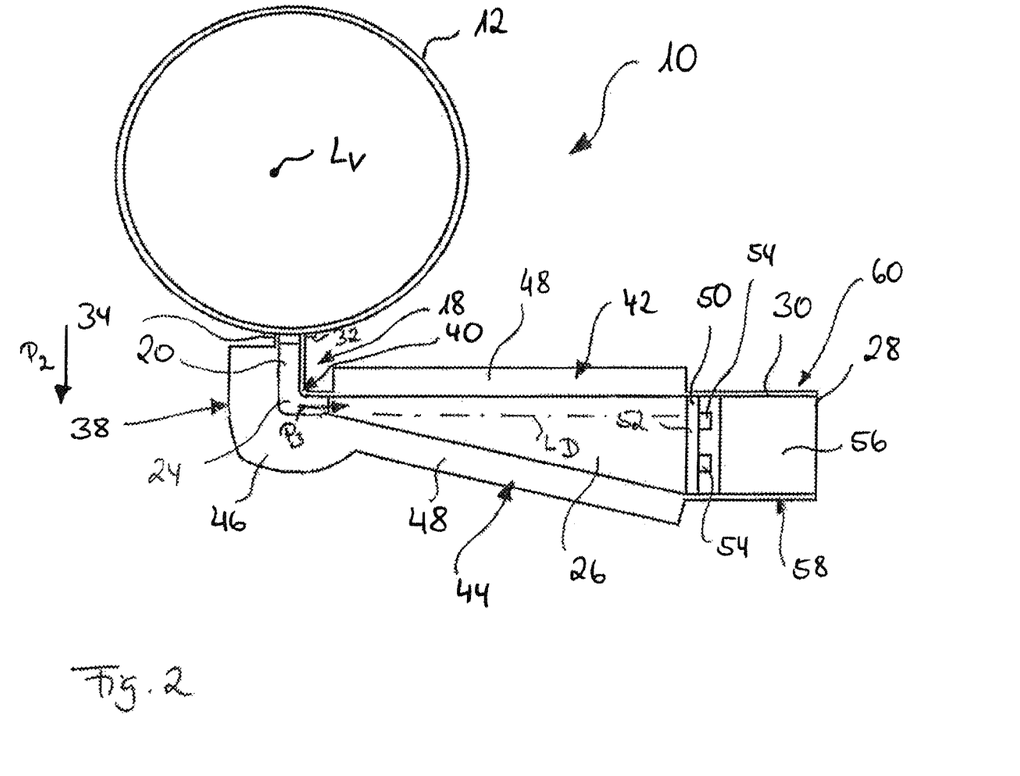

FIGS. 1 and 2 show an air guiding element 10 which is provided for use in an aircraft air-conditioning system. The air guiding element 10 comprises a distributing pipe 12 which has a round cross-section in the embodiment shown in FIGS. 1 and 2. In the region of a first end face, the distributing pipe 12 is provided with an air inlet opening 14. In contrast, in the region of a second end face opposite the first end face, the distributing pipe 12 is closed. In a generated surface of the distributing pipe 12 there is formed a slit-shaped air discharge opening 16 which extends parallel to a longitudinal axis $L_V$ of the distributing pipe 12 over almost the entire length of the distributing pipe 12. The air guiding element 10 further comprises a flow diverting element 18 connected to the distributing pipe 12. The flow diverting element 18 has a first section 20 connected to the air discharge opening 16 of the distributing pipe 12. The first section 20 of the flow diverting element 18 is connected to a curvedly formed second section 24 of the flow diverting element 18. The flow cross-section of the flow diverting element 18, that is to say the cross-section of an interior space of the flow diverting element 18 through which air can flow, corresponds to the flow cross-section of the air discharge opening 16 of the distributing pipe 12. The flow diverting element 18 is consequently of gapped arcuate form, that is to say the first section 20 of the flow diverting element 18 extends at an angle of approximately 90° to the generated surface of the distributing pipe, while the second section 24 of the flow diverting element is shaped such that it diverts the air flow at an angle of approximately 90° to the direction of the air flow through the first section 20 of the flow diverting element 18.

Adjoining the second section 24 of the flow diverting element 18 is a diffuser 26, the flow cross-section of which widens continuously in the direction of an air outlet opening 28 of the air guiding element 10. Between the diffuser 26 and the air outlet opening 28, however, there additionally extends an air outlet channel 30 which has a constant flow cross-section corresponding to the flow cross-section of the air outlet opening 28.

The flow diverting element 18, the diffuser 28 and the air outlet channel 30 are formed by two shells which can be connected to one another and delimit the interior space of the flow diverting element 18 through which air can flow and also interior spaces of the diffuser 26 and of the air outlet channel 30 through which air can flow (see FIG. 1). The shells forming the flow diverting element 18, the diffuser 26 and the air outlet channel 30 are composed, at least in sections, of a glass-fibre-reinforced plastics material. The distributing pipe 12 can likewise be composed of a glass-fibre-reinforced plastics material or another suitable material. To connect the flow diverting element 18, the diffuser 26 and the air outlet channel 30 to the distributing pipe 12, flange sections 32, 34 are provided on each of the shells forming the flow diverting element 18, the diffuser 26 and the air outlet channel 30 at an end of the flow diverting element 18 facing the distributing pipe 12, by means of which flange sections the distributing pipe 12 can be adhesively bonded or otherwise connected to the flow diverting element 18, the diffuser 26 and the air outlet channel 30.

In the flow diverting element 18 there are arranged a plurality of webs 36 which extend between a side wall 38 of the flow diverting element 18 forming an outer radius of the flow diverting element 18 and a side wall 40 of the flow diverting element 18 forming an inner radius of the flow diverting element 18. The webs 36 are formed integrally with the side wall 38 forming an outer radius of the flow diverting element 18. Alternatively to this, however, the webs 36 may also be formed integrally with the side wall 40 forming an inner radius of the flow diverting element 18. Ends of the webs 36 facing the distributing pipe 12 are arranged at a distance from the air discharge opening 16 of the distributing pipe 12 which corresponds approximately to the distance of the side walls 38, 40 of the flow diverting element 18 from one another. In contrast, ends of the webs 36 facing away from the distributing pipe 12 extend up to an end of the flow diverting element 18 facing the diffuser 26. The flow diverting element 18 is subdivided by the webs 36 into a multiplicity of guiding channels, their width, that is to say the distance between two mutually adjacent webs, being approximately twice as big as their height, that is to say the distance between the side wall 38 of the flow diverting element 18 forming an outer radius of the flow diverting element 18 and the side wall 40 of the flow diverting element 18 forming an inner radius of the flow diverting element 18.

As can best be sent in FIG. 2, the diffuser 26 comprises a first side wall 42 which faces the distributing pipe 12 and extends substantially parallel to a longitudinal axis $L_D$ of the diffuser 26. In contrast, a second side wall 44 of the diffuser 26 facing away from the distributing pipe 12 is inclined at an angle of approximately 14° to the longitudinal axis $L_D$ in a direction facing away from the distributing pipe 12, that is to say downwards in FIG. 2, in order to realise the continuously widening flow cross-section of the diffuser 26. The longitudinal axis $L_D$ of the diffuser 26 extends so as to form a continuation of the flow direction of the air as it leaves the second section 24 of the flow diverting element 18.

The side wall 38 of the flow diverting element 18 forming an outer radius of the flow diverting element 18 is composed, in sections, of a sound-absorbing foam material 46. Similarly, the first and the second side wall 42, 44 of the diffuser 26 are likewise composed of a sound-absorbing foam material 48. As a sound-absorbing material 46, 48 it is possible to use, for example, a polyimide foam or a melamine foam, such as, for example, a Basotec® foam. The sound-absorbing foam material 46, 48 is integrated in the shells made of a glass-fibre-reinforced plastics material forming the flow diverting element 18 and the diffuser 26 in such a way that surfaces of the flow diverting element 18 and of the diffuser 26 facing the interior space of the flow diverting element 18 and of the diffuser 26 are formed by the foam material 46, 48 in the region of the foam material sections. In other words, the foam material 46, 48 is not applied to the shells composed of a glass-fibre-reinforced plastics material, but forms an integral constituent of the surfaces of these two components facing the interior space of the flow diverting element 18 and of diffuser 26. To stabilise the foam material surfaces facing the interior space of the flow diverting element 18 and of the diffuser 26, a cover in the form of a perforated laminate is applied to these surfaces.

An apertured screen 50 is arranged in the air outlet channel 30, at an end of the air outlet channel 30 facing the diffuser 26. The apertured screen 50 comprises a base plate 52, the dimensions of which correspond to the flow cross-section of the air outlet channel 30. On a surface of the apertured screen base plate 52 facing the diffuser 26, holes formed in the apertured screen base plate 52 are provided with an entry radius at their edges. In other words, the holes formed in the apertured screen base plate 52 have no sharp edges, but "soft" edges. Extending from a surface of the apertured screen base plate 52 facing away from the diffuser 26 are air guiding sleeves 54, the length of which corresponds to their inside diameter. The holes formed in the apertured screen base plate 52 and the air guiding sleeves 54 are arranged in two mutually parallel rows, the spacing of the rows being equal to the spacing of two adjacent holes and air guiding sleeves 54 in one row.

Furthermore, a plurality of guide plates 56 are arranged in the air outlet channel 30, which extend in the direction of the air outlet opening 28 from a first side wall 58 of the air outlet channel 30 up to a second side wall 60 of the air outlet channel 30. The guide plates 56 subdivide the air outlet channel 30 into a plurality of part-channels. Their end facing the diffuser 26 is arranged at a distance from the air guiding sleeves 54 of the apertured screen 50 which corresponds to the inside diameter of the air guiding sleeves 54. At their end facing away from the diffuser 26, the guide plates 56 extend up to the air outlet opening 28, that is to say the guide plates 56 end at an edge of the air outlet channel 30 opening into the air outlet opening 28.

In what follows, the functioning of the air guiding element 10 will be explained in more detail. In the operation of the air guiding element 10, air provided by an aircraft air-conditioning system enters the air guiding element 10 through the air inlet opening 14 of the distributing pipe 12. The flow direction of the air during this is parallel to the longitudinal axis $L_V$ of the distributing pipe 12 and is symbolised by the arrow $P_1$ in FIG. 1. The air supplied into the distributing pipe 12 is led out of the distributing pipe 12 into the flow diverting element 18 via the air discharge opening 16. This narrowing of the flow cross-section causes a pressure to build up in the distributing pipe 12 which is determined, on the one hand, by the narrowing of the flow cross-section in the region of the air discharge opening 16 and, on the other hand, by the length of the flow path through the flow diverting element 18.

On leaving the distributing pipe 12 through the air discharge opening 16, the air supplied via the air inlet opening 14 is diverted by 90° relative to the flow direction in the region of the air inlet opening 14. In other words, the air flows through the first section 20 of the flow diverting element 18 at an angle of 90° to the direction of the flow through the air inlet opening 14. This is illustrated by the arrow $P_2$ in FIG. 2. A further diversion of the flow takes place in the flow diverting element 18, that is to say in the second section 24 of the flow diverting element 18 the air is once again diverted by an angle of approximately 90° to the flow direction through the first section 20 of the flow diverting element 18. The direction of the flow on leaving the second section 24 of the flow diverting element 18 is illustrated by the arrow $P_3$ in FIG. 2.

On entering the flow diverting element 18, the air still has a momentum in the direction of the air flow through the air inlet opening 14, that is to say in the direction of the arrow $P_1$. This momentum is, however, minimised by the webs 36 formed in the flow diverting element 18. In other words, the webs 36 ensure that the air flow on flowing through the guiding channels formed by the webs 36 is diverted in the desired direction.

In the diffuser 26, the flow slows down and is continuously distributed over the flow cross-section of the air outlet opening 28. As the air enters the diffuser 26, however, the air flow still has a momentum in the direction of the arrow $P_2$ owing to the diversion in the flow diverting element 18. The phenomenon is taken into account by the fact that the diffuser 26 is not formed symmetrically, but merely the second side wall 44 of the diffuser 26 is inclined relative to the longitudinal axis $L_D$ of the diffuser 26 in the direction of the air flow of the air through the first section 20 of the flow diverting element 18, that is to say in the direction of the arrow $P_2$. This configuration of the diffuser 26 ensures proper functioning of the diffuser 26.

Finally, in front of the apertured screen 50, the air flowing through the air guiding element 10 is once again backed up owing to the narrowing of the flow cross-section by the apertured screen 50. The pressure drop across the apertured screen 50 is approximately 50 Pa at a nominal air flow rate. Since the holes formed in the apertured screen base plate 52 have no sharp edges, but are provided with a "soft" entry radius, the formation of turbulence as the air flows into these holes is minimised. Finally, the air guiding sleeves 54 ensure guidance of the flow and minimisation of any turbulence that may be present. The final flow control takes place, finally, with the aid of the guide plates 56 which ensure further guidance of the flow before the air leaves the air outlet opening 26.

Noise which is produced by the multiple changes of the flow cross-section along the flow path through the air guiding element 10 and by the diversion of the air flow on flowing through the air guiding element 10 is damped with the aid of the sound-absorbing foam material 46, 48. The sound is reflected, in the region of the flow diverting element 18, on the side wall 40 of the flow diverting element 18 forming an inner radius of the flow diverting element 18. Forming the side wall 40 of the flow diverting element 18, at least in sections, with a sound-absorbing foam material would therefore not be effective for sound damping. It is therefore sufficient merely to form the side wall 38 of the flow diverting element 18 forming an outer radius of the flow diverting element 18, in sections, from a sound-absorbing foam material 46. When designing the thickness of the foam material 46, however, the sound reflection on the side wall 40 of the flow diverting element 18 forming an inner radius of the flow diverting element 18 must be taken into consideration, that is to say the foam material 46 must have a greater thickness than would be necessary without reflection effects. For example, the thickness of the foam material 46 provided in the region of the side wall 38 of the flow diverting element 18 forming an outer radius of the flow diverting element 18 may be 25 mm.

In contrast, no reflection effects occur in the region of the diffuser 26, so that it is expedient to form both side walls 42, 44 of the diffuser 26 at least in sections from a sound-absorbing foam material 48. The thickness of the foam material 48 here may be less than the thickness of the foam material 46 used in the region of the flow diverting element 18. For example, a foam material thickness of 15 mm may be sufficient in the region of the diffuser 26.

In an aircraft air-conditioning system, the air guiding element 10 may be used as a single element. For example, the air guiding element 10 may be dimensioned such that it bridges the spacing between two frames of the aircraft structure. Alternatively to this, however, it is also conceivable to dimension the distributing pipe 12, the flow diverting element 18, the diffuser 26, the air outlet channel 30 and the other components of the air guiding elements 10 such that the air guiding element 10 extends over more than one frame breadth. As a further alternative, the distributing pipe 12 may have a length extending, for example, over more than one frame breadth and an adapted diameter and be provided with a plurality of air discharge openings 16 formed separately from one another. These air discharge openings 16 may then be connected to a flow diverting element 18, a diffuser 26 and an air outlet channel 30 which each extend over, for example, one frame breadth.

The invention claimed is:

1. An air guiding element for an aircraft air-conditioning system, comprising:
    a distributing pipe having an air inlet opening arranged in the region of an end face of the distributing pipe and an air discharge opening arranged in the region of a generated surface of the distributing pipe,
    a flow diverting element having a first section connected to the air discharge opening of the distributing pipe and a second section arranged downstream of the first section relative to the direction of the air flow through the air guiding element, the second section being configured to deflect the air as it flows through the second section at an angle of approximately 45 to 135° relative to the direction of the air flow through the first section, and
    a diffuser which is arranged downstream of the second section of the flow diverting element relative to the direction of the air flow through the air guiding element and is connected to an air outlet opening,
    wherein the diffuser has a flow cross-section widening in the direction of the air flow from the air discharge opening to the air outlet opening,
    wherein at least one of the flow diverting element and the diffuser includes a side wall that is composed at least in sections of a sound-absorbing foam material, the side wall of sound-absorbing foam material defining a surface facing at least one of an interior space of the flow diverting element and an interior space of the diffuser, the sound-absorbing foam material being provided with a perforated cover in the form of a perforated laminate applied only to the surface of the sound-absorbing foam material facing at least one of an interior space of the flow diverting element and an interior space of the diffuser so as to protect the surface of the sound-absorbing foam material from damaging effects caused by air flow through the flow diverting element and diffuser, wherein there are arranged in the flow diverting element a plurality of webs which extend parallel to the flow direction of the air through the flow diverting element, and
    wherein the webs are defined by elongated L-shaped plate elements extending across the interior space of the flow diverting element to subdivide the interior space into a plurality of parallel guiding channels extending throughout the second section to deflect the air flow through the angle of approximately 45 to 135°, the webs being oriented to block cross flow between the guiding channels to minimize momentum of air flow in the direction of the air flow through the distributing pipe, and the guiding channels delivering deflected air flow directly into the diffuser.

2. The air guiding element according to claim 1, wherein the air discharge opening of the distributing pipe is of slit-shaped form and extends parallel to a longitudinal axis of the distributing pipe over at least 80% of the length of the distributing pipe.

3. The air guiding element according to claim 1, wherein the second portion of the flow diverting element is configured to divert the air as it flows through the second section at an angle of approximately 90° relative to the direction of the air flow through the first section.

4. The air guiding element according to claim 1, wherein the flow diverting element is formed by two shells which are connectable to one another and delimit an interior space of the flow diverting element through which air can flow and/or in that the diffuser is formed by two shells which are connectable to one another and delimit an interior space of the diffuser through which air can flow.

5. The air guiding element according to claim 1, wherein the diffuser has a first side wall arranged substantially parallel to a longitudinal axis of the diffuser and a second side wall inclined at an angle to the longitudinal axis of the diffuser in the direction of the flow of the air through the first section of the flow diverting element.

6. The air guiding element according to claim 1, wherein a side wall of the flow diverting element forming an outer radius of the flow diverting element is composed at least in sections of the sound-absorbing foam material and/or in that the first and the second side wall of the diffuser are composed at least in sections of the sound-absorbing foam material.

7. The air guiding element according to claim 1, further comprising:
    an air outlet channel which is formed downstream of the diffuser relative to the direction of the air flow through the air guiding element and in which an apertured screen is arranged, holes formed in a base plate of the apertured screen being provided in the region of a surface of the base plate facing the diffuser with an entry radius at their edges.

8. The air guiding element according to claim 7, wherein there are arranged in the air outlet channel a plurality of guide plates which extend in the direction of the air outlet opening.

9. An aircraft air-conditioning system, comprising:
    at least one air guiding element according to claim 1.

10. The air guiding element of claim 7, further comprising:
    one or more air guiding sleeves extending from a surface of the base plate facing away from the diffuser.

11. The air guiding element of claim 10, wherein one or more of the air guiding sleeves has a length which corresponds to an inside diameter of the guiding sleeve.

12. The air guiding element of claim 1, wherein the flow cross-section of the diffuser widens continuously in the direction of flow.

13. The air guiding element of claim 1, wherein ends of the webs facing the distributing pipe are spaced a distance from the air discharge opening along the direction of the air flow.

14. The air guiding element of claim 13, wherein the distance corresponds to a width of a through-flow gap defined between the opposing sidewalls of the flow diverting element.

* * * * *